Patented Aug. 9, 1949

2,478,831

UNITED STATES PATENT OFFICE 2,478,831

CEMENT COMPOSITION AND PROCESS OF MAKING SAME

Donald R. MacPherson, University Heights, Ohio, assignor to The Master Builders Company, Cleveland, Ohio, a corporation of Ohio No Drawing. Application October 13, 1945, Serial No. 622,237

10 Claims. (Cl. 106—90)

This invention relates to hydraulic cement compositions and to a method of making the same. It particularly relates to the method of grinding hydraulic cement and to a method of preparing cement compositions having improved weather-resistant properties.

It has been known that certain materials, such for example as a certain saponifiable resin, the long-chain alkyl sulfates such as lauryl sodium sulfate and the like, when added to a cement composition in relatively small amounts cause the cement composition to entrain a small amount of air, which surprisingly exerts a marked improvement in the ability of the concrete to withstand freezing and thawing cycles. Other materials, generally designated as grinding aids, have been proposed which exert marked shortening of the time required for grinding cement clinker. The air-entraining materials heretofore proposed, as far as I am aware, either have been found to lose a substantial proportion of their effectiveness when ground with cement clinker or have had no noticeable function as grinding aids, in fact they are sometimes found to have an undesirable effect on the rate of grinding.

Air-entraining agents such as alkali metal alkyl sulfates when ground with cement do not exert a desirable influence on the grinding rate. One of the widely used resinous air-entraining agents, is subject to the disadvantage that its air-entraining properties are dependent on the degree of saponification by alkali and alkaline earth metals of the cement. When this resin is interground with the cement, the degree of saponification apparently varies, with the result that the amount of entrained air in the concrete becomes variable and it is very difficult, if not impossible, to control within narrow limits.

It is an object of the present invention to provide an air-entraining agent or a class of air-entraining agents which may be ground with cement without losing their effectiveness.

It is another object of the present invention to provide air-entraining agents which may be ground with the cement without losing their effectiveness and which have no deleterious effect on the rate of grinding or on any additional grinding aids which may be present.

It is a further object of the present invention to provide a grinding aid which facilitates the grinding of cement clinker to provide a greater amount of cement of a given fineness in a given time or to provide a cement of greater fineness in a given time, which grinding aid also gives to the concrete or mortar made therewith air-entraining properties of an order of magnitude sufficient to improve substantially its ability to withstand freezing and thawing.

Another disadvantage of most air-entraining agents that I am aware of is that the amount of air that is formed in the mix varies with the mix design, i. e., the ratio of sand to total aggregate. As the sand to total aggregate ratio increases, the amount of air entrained and retained at a given consistency is usually increased. Therefore, to provide a desirable amount of air in the concrete, one had heretofore to specify the mix design, the type of aggregate, etc.

It is a further object of the present invention to provide an air-entraining agent which may be incorporated with cement in the preparation of mixes or ground with the cement in the preparation thereof, and which entrains a similar amount of air in concrete mixes having different cement to total aggregate ratios.

The above and other objects, which will be apparent from the following description of the invention, are accomplished by incorporating in the cement one or more members of the group consisting of long-chain aliphatic dicarboxylic acids which contain besides the two carboxyl groups only a hydrocarbon group, salts and esters thereof, and distillation residues obtained from the preparation of dialiphatic or dialkyl esters of such long-chain acids. The general formula of the acids, salts and esters is

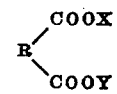

$$R\begin{matrix}COOX\\COOY\end{matrix}$$

where R is a hydrocarbon group, preferably an aliphatic hydrocarbon group, and X and Y are each hydrogen, a metal, the equivalent of a monovalent metal radical or an organic group, preferably an alkyl group. The hydrocarbon chain between carboxyl groups should preferably have a length of at least 5 or 6 carbon atoms, and when it is longer than 12 to 14 carbon atoms the activity of the compounds appear to be adversely affected. When the carbon chain is saturated, the preferred compounds have a carbon chain of 7 to 10 carbons between carboxyl groups; but, when the carbon-to-carbon chain contains an olefin group, a chain of 9 to 12 carbons is preferred.

Of the long-chain dicarboxylic acids and derivatives, sebacic acid and its derivatives appear to be outstanding. Sebacic acid and/or its soluble salt, such as sodium or potassium sebacate, may be incorporated with the cement clinker before grinding thereof or incorporated after grinding, as for example in the preparation of cement, concrete or mortar mixes. The esters of sebacic acid, and especially the still residue from distillation of sebacic acid esters as obtained in the manufacture of sebacic acid esters by reaction of sebacic acid and an alcohol, on the other hand surprisingly have little air-entraining properties when incorporated with the ground cement in the preparation of concrete or mortar mixes; but, when they are ground with the clinker in preparing the cement, they are found to be highly desirable.

Of all the aforementioned sebacic compounds, the distillation residue obtained from stills utilized in the preparation and purification of dibutyl sebacate is found to be most desirable for incorporation with the cement clinker. This material usually contains a substantial proportion, sometimes as much as 75% to 85%, of dibutyl sebacate (based on the recovery of butyl alcohol and the saponification value of the materials). It exerts a most desirable effect when incorporated with the cement clinker and ground; it has relatively no appreciable effect when added as an additive to cement or mortar mixes.

This still residue, like other of the aforementioned dibasic aliphatic acid or sebacic compounds, including sebacic acid, the sodium salt thereof, etc., should generally be present in amounts not substantially exceeding .1% of the weight of the cement and preferably should be present in amounts of about .02% to about .05% or .06% by weight of the cement. As little as .01% of the sebacic acid compound or still residue from the preparation above exerts an appreciable improvement on cements, but in amounts less than .005% has little effect.

Dibasic aliphatic acid compounds other than sebacic acid and its alkali metal salts, such as sodium, ammonium or potassium sebacates, which have a desirable effect when ground with cement include the alkyl esters, such as diethyl, dipropyl, dibutyl, dihexyl esters of sebacic acid, 1,6-hexane dicarboxylic acid, 1,10-decane dicarboxylic acid, etc. The still residues obtained from the production of such esters are preferred.

The following examples illustrate the present invention:

*Example 1*

The same Portland cement clinker was divided into equal lots and each of the lots was separately ground for 120 minutes. One lot was ground without an addition and the other lots were ground with additions of still residues obtained from the distillation of dibutyl sebacate in the preparation or purification thereof. The specific surface of the cements and the percentage increase in specific surface due to the grinding aids are also set forth in the following table:

| Per Cent Grinding Aid (by wt. cement) | Specific Surface cm.²/g.— Cement | Per Cent Increase in Specific Surface Over Plain |
|---|---|---|
| None—Plain | 1,640 | |
| 0.01 Still Residue | 1,655 | 0.9 |
| 0.03 Still Residue | 1,700 | 3.7 |
| 0.05 Still Residue | 1,810 | 10.4 |

It will be noted from the above tabulation that the dibutyl sebacate still residue becomes progressively more efficient as a grinding aid as the quantity increases. Larger quantities of still residue than those shown give a further increase in grinding efficiency. However, for some commercial applications, .05% gives about the maximum amount of air desired in cement, mortar or concrete mixes. Further increases in grinding efficiency may be obtained by also incorporating an additional grinding aid with the clinker. Such grinding aids are preferably hydroxy or polyhydroxy aliphatic compounds such as glycols, glycol ethers, 2-methyl-2,4-pentanediol and the like, substituted benzoic acids and derivatives thereof such as salicylic acid, salicylates, etc., which are usually used in amounts between .01% and .1% by weight of the cement.

*Example 2*

A given cement clinker was divided into two batches and ground for the same length of time as in Example 1, one batch serving as the control and the other batch having added thereto .05% by weight of the cement of sebacic acid. The specific surface of the cement obtained from the plain grind was 1600 cm.²/g. whereas the specific surface of the cement obtained from the clinker containing .05% of sebacic acid was 1740 cm.²/g., representing an 8.8% increase in specific surface over the plain grind.

*Example 3*

To illustrate the air-entraining properties of still residue obtained from the distillation of dibutyl sebacate during the preparation thereof from sebacic acid and butyl alcohol, cements ground with .01%, .03% and .05% by weight of the cement of still residue were made up into concretes of two radically differently mixed designs. In Mix #1, the sand-total aggregate ratio was 60% and in Mix #2 the sand-total aggregate ratio was 36% to 39%. The consistency of the two mix designs was substantially the same, although the slump was somewhat different due to aggregate size. The still residue was incorporated with the cement clinker prior to the grinding thereof. All cements were prepared from the same clinker. The essential data concerning the mixtures is shown in the following table.

| | Still Residue, Per cent by wt. cement | Water-Cement, Gallons/sack | Sand-Total Aggregate Ratio, Per cent | Total Air, Per cent by vol. | Slump, Inches |
|---|---|---|---|---|---|
| Mix #1 | 0.01 | 7.24 | 60 | 4.2 | 4 |
| | 0.03 | 6.80 | 60 | 7.2 | 4 |
| | 0.05 | 6.80 | 60 | 7.2 | 4 |
| Mix #2 | 0.01 | 6.50 | 39 | 4.6 | 3.5 |
| | 0.03 | 6.09 | 39 | 8.4 | 3 |
| | 0.05 | 5.10 | 36 | 8.4 | 3 |

It will be seen from the above tabulation that the percentage of total air remains about the same, even though Mixes #1 and #2 were radically different. It will also be seen that the maximum air entrained is that obtained with 0.03% still residue. The fact that no increase in air content of the resultant concrete is had when the amount of still residue is increased to 0.05% is of importance where a greater amount of still residue is desirable as a grinding aid to gain optimum efficiency without having the resultant cement entrain excessive amounts of air.

*Example 4*

To illustrate the influence of sebacic acid compounds upon the compressive strength of concrete, two batches of mortar were prepared in accordance with A. S. T. M. Mortar Specification C-109. One batch was prepared with a cement of substantially the same specific surface, but it was ground without a sebacic acid additive. The second batch was identical except for .05% sebacic acid interground with the cement. Two-inch standard mortar cubes were prepared from each of the batches. The cubes of both batches were tested for compressive strength at ages of 1 day, 3 days, 7 days and 28 days. The average values of the compressive strength of the cubes, together with other pertinent data, are shown in the following table:

| Addition percent by wt. Cement | Specific Surface, cm.²/g. | Water-Cement by wt. | Addition Air per cent by Volume | Compressive Strengths, lbs./sq. in. Days | | | |
|---|---|---|---|---|---|---|---|
| | | | | 1 | 3 | 7 | 28 |
| None | 1,750 | 0.53 | | 890 | 2,350 | 3,310 | 5,700 |
| .05 Sebacic Acid | 1,740 | 0.53 | 2.0 | 970 | 2,635 | 3,640 | 5,815 |

Example 5

To illustrate the effectiveness of .01%, .03% and .05% of still residues which are obtained from the distillation of dibutyl sebacate, several batches of concrete were made utilizing cements prepared from the same clinker. The cements for the separate batches differed only in the amount of still residue added during grinding, but the cement of Batch #1 was ground without an addition and served as a control. Cements of Batches #2, #3 and #4 were ground with .01%, .03% and .05%, respectively, of still residue. The aggregate in each case was three-quarter inch stone. The cement factor, water-cement ratio, slump of a twelve-inch cone, total volume of air entrained, unit weight in pounds per cubic foot of concrete, together with average compressive strengths of 6" x 12" cylinders prepared from each batch of the concrete are shown in the following table:

The cement compositions of the present invention may also contain an accelerator to increase the hardening and setting properties of the cement, such for example as calcium chloride, which may be present in amounts of 1% to about 3%, and/or a cement dispersing agent, and/or a compound containing the salicylate group such as salicylic acid, salts or esters thereof. The cement dispersing agents preferred are active or cement-dispersing constituents of waste sulfite liquor, or the dried residue thereof. Other cement dispersing agents, such as the whole waste sulfite liquor, the condensation product of naphthalene sulfonic acid and formaldehyde. To obtain a beneficial result from one or more cement dispersing agents, it is generally desirable that they be present in a total amount of .05% to .5% or .6% by weight of the cement. The preferred amount of dispersing agent is usually about .1% to .3%, although as much as .5% or .6% of some dispersing agents may be used.

The dibasic acid or sebacic acid compounds of the present invention may be mixed with dispersing agents and/or accelerator in proportion to form when added to cement .005% to .1% of the sebacic acid compound and also .05% to .5% by weight of the amount of dispersing agent and/or 1% to 2.5% or 3% by weight of the cement of an accelerator, such as calcium chloride, which accelerates the hardening and setting of the

| Batch | Still Residue | Specific Surface Cement, cm.²/g. | Cement Factor [1] | Water-to Cement Gal./Sack | Slump, Inches | Unit Weight [2] | Total Air, Per cent | Compressive Strength, lbs./sq. in. | |
|---|---|---|---|---|---|---|---|---|---|
| | | | | | | | | 7 days | 28 days |
| 1 | None | 1,760 | 4.78 | 7.76 | 3¼ | 149.3 | 0.3 | 2,520 | 3,120 |
| 2 | 0.01 | 1,655 | 4.87 | 6.50 | 3¼ | 145.0 | 4.6 | 2,520 | 3,180 |
| 3 | 0.03 | 1,700 | 4.73 | 6.09 | 3½ | 140.0 | 8.4 | 2,070 | 3,220 |
| 4 | 0.05 | 1,810 | 5.13 | 5.10 | 3 | 141.5 | 8.6 | 2,800 | 3,200 |

[1] Sacks per cubic yard.
[2] Pounds per cubic foot.

It will be seen from the above table that even though the concrete of Batches #3 and #4 contain over 8% air, the 28-day strengths are still as good as or better than the control.

The Portland cement in the above examples may be substituted by aluminous cement or other hydraulic cement if desired.

It is seen from the above tests that the dibasic acid compounds of the present invention, particularly still residue obtained from the preparation of sebacic acid esters, have a multifold function in concrete or mortar mixes when they are incorporated with the cement during the grinding of the clinker. Thus, it is seen that the additions reduce the grinding time and energy required to prepare a cement of a given fineness. They act to improve the strength or setting properties of the concrete while simultaneously entraining air in amounts to be most desirable for increasing the resistance to freezing and thawing of concrete or mortar.

cement. Such a mixture is a particularly desirable indurating composition which may be incorporated with the cement mix at any time. When the aliphatic dibasic acid compound is a sebacic acid ester such as an alkyl ester or a still residue from the preparation of an alkyl ester of sebacic acid, such as a still residue from the distillation of dibutyl sebacate, the indurating composition is preferably ground with the cement to obtain full advantages from the composition, as aforementioned.

Another desirable indurating composition for addition to cement may comprise one or more of the aforementioned aliphatic dibasic acid compounds, such as the still residue from the manufacture of dibutyl sebacate, and a member of the group consisting of substituted benzoic acids, salts and esters thereof with, for example, salicylic acid, etc. as set forth in the Scripture Patents Nos. 2,360,517 and 2,264,336, with the ingredients proportioned to give when admixed with cement .005% to .05% or 0.1% by weight of the cement of the aliphatic dibasic acid compound and .005% or .01% to .5% of said group member or members.

While sebacic acid compounds are preferred in the exercise of the present invention, other dicarboxylic acids or acid compounds having two carboxylic groups separated by a saturated or even an olefinic chain of six to twelve carbon atoms may be used to obtain some of the benefits of the present invention. Thus 1,10-decane dicarboxylic acid, its salts, esters and still residue obtained from the preparation of such esters, may also be utilized by substitution for an equivalent amount of the sebacic acid compound aforementioned. The expression "alkane dicarboxylic compound having two carboxyl groups separated by an alkyl group of six to twelve carbon atoms" is intended to include these compounds.

As used herein, the term "sebacic acid compound" is used to designate sebacic acid, its salts, esters and the still residues remaining after distillation of sebacic acid esters.

Furthermore, it is to be understood that the particular form of product shown and described and the particular procedure set forth are presented for purposes of explanation and illustration and that various modifications of said product and procedure can be made without departing from my invention as defined in the appended claims.

What I claim is:

1. In a method of making an hydraulic cement composition, the step which comprises incorporating with the cement during the grinding thereof .005% to 0.5% by weight of the cement of at least one member selected from the group consisting of sebacic acid, its salts and alkyl esters.

2. The method of claim 1 wherein said compound is dibutyl sebacate.

3. A dry cement comprising an hydraulic cement and at least one member selected from the group consisting of sebacic acid, its salts and alkyl esters, said compound being present in the amount of .005% to .5% of the weight of the cement.

4. The dry cement according to claim 3 wherein said compound is dibutyl sebacate.

5. The process of preparing improved hydraulic cement, concrete or motor mixes for structural purposes in which the hydraulic cement constitutes the main binding ingredient, which comprises mixing with the hydraulic cement an accelerator for increasing the hardening of the cement, and at least one member selected from the group consisting of sebacic acid, its salts and alkyl esters, said compound being present in the amount of .005% to .5% of the weight of the cement.

6. The process of preparing improved hydraulic cement, concrete or mortar mixes for structural purposes in which the hydraulic cement constitutes the main binding ingredient, which comprises mixing with the hydraulic cement an accelerator for increasing the hardening of the cement, and dibutyl sebacate, said dibutyl sebacate being present in amounts of .01% to .1% by weight of the cement in said concrete or mortar mixes.

7. The method of claim 5 wherein a cement dispersing agent is also present.

8. A mortar or concrete mix, comprising an hydraulic cement, aggregate, at least one member selected from the group consisting of sebacic acid, its salts and alkyl esters, in an amount of .01% to .1% by weight of the cement, and a cement dispersing agent in an amount of .05% to .6% by weight of the cement.

9. The mortar or concrete mix of claim 8 which also contains a member of the group consisting of substituted benzoic acids, salts and esters thereof, in an amount of .005% to .5% by weight of the cement.

10. The mortar or concrete mix of claim 8 which also contains calcium chloride and a member of the group consisting of substituted benzoic acids, salts and esters thereof, in an amount of .005% to .5% by weight of the cement, and calcium chloride in the amount of 1% to 3% by weight of the cement.

DONALD R. MacPHERSON.

REFERENCES CITED

The following references are of record in the file of this patent:

UNITED STATES PATENTS

| Number | Name | Date |
|---|---|---|
| 2,366,737 | Loder et al. | Jan. 9, 1945 |
| 2,397,886 | Scripture | Apr. 2, 1946 |